United States Patent [19]

Witte

[11] 3,828,822
[45] Aug. 13, 1974

[54] ADJUSTABLE PRESSURE CONTROL VALVE

[76] Inventor: Theo Witte, 1630 Emerald Way, Perris, Calif. 92370

[22] Filed: May 21, 1973

[21] Appl. No.: 362,397

[52] U.S. Cl.................. 138/45, 137/505.21, 251/9
[51] Int. Cl.............................................. F15d 1/02
[58] Field of Search.......... 138/40, 44, 45; 137/505, 137/21; 251/9, 5, 6

[56] References Cited
UNITED STATES PATENTS

| | | | |
|---|---|---|---|
| 1,108,128 | 8/1914 | Buffum | 251/9 X |
| 2,434,835 | 1/1948 | Colley | 138/45 |
| 2,483,954 | 10/1949 | Weiss | 137/505.21 |
| 2,904,809 | 9/1959 | Clayson | 138/44 X |
| 3,511,468 | 5/1970 | Young | 251/6 |

Primary Examiner—Richard C. Queisser
Assistant Examiner—Daniel M. Yasich
Attorney, Agent, or Firm—Howard I. Podell

[57] ABSTRACT

A pressure regulating valve which is readily adjustable in continuous operation, for regulating the outlet pressure of a fluid, liquid or gas, flowing through the valve, said valve being capable of maintaining a uniform outlet pressure despite variations in the rate of flow or in the inlet line pressure. The valve contains a flexible tubing or bladder through which the fluid flows, with a lever arm resting along the length of the tubing. The lever arm is backed against a roller which may be located at any point along the length of the lever arm, so as to vary the pivot point of the lever arm as rotated by the pressure exerted by the tubing against both sides of the pivot point. Rotation of the lever arm in the closing direction acts to clamp the input end of the tubing so as to restrict the flow of fluid into the tubing and thus restrict the outlet fluid pressure.

3 Claims, 3 Drawing Figures

PATENTED AUG 13 1974  3,828,822

ADJUSTABLE PRESSURE CONTROL VALVE

SUMMARY OF THE INVENTION

This invention relates to a valve for regulating the flow and pressure of a fluid flowing through the valve, with means to adjust the flow and outlet fluid pressure.

The advantage of this valve is that the fluid is completely enclosed in the mechanism by a flexible tube connecting the intake with the outlet of the valve, so as to prevent the fluid from exerting any corrosive or deleterious effect on the valve mechanism. Aside from the external restriction exerted on the flow tube for regulation purposes, the valve mechanism interposes no obstruction to the flow of fluid through the valve tube. The valve tube may be readily replaced for maintenance purposes. In operation the flow pressure is adjustable over the complete range, with the maximum flow determined by the diameter of the valve tube, and valve inlets and outlets.

Flow of fluid, either gas or liquid, through the flexible valve tube acts to expand the tube in diameter and to exert a pressure against a lever arm externally lying along the length of the valve tube. The lever arm is restricted by a roller pivot, with said pivot being slidable for the purposes of adjustment. Rotation of the lever arm about said roller pivot, in the closing direction, acts to restrict the intake section of the valve tube, thus limiting the intake flow and pressure.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
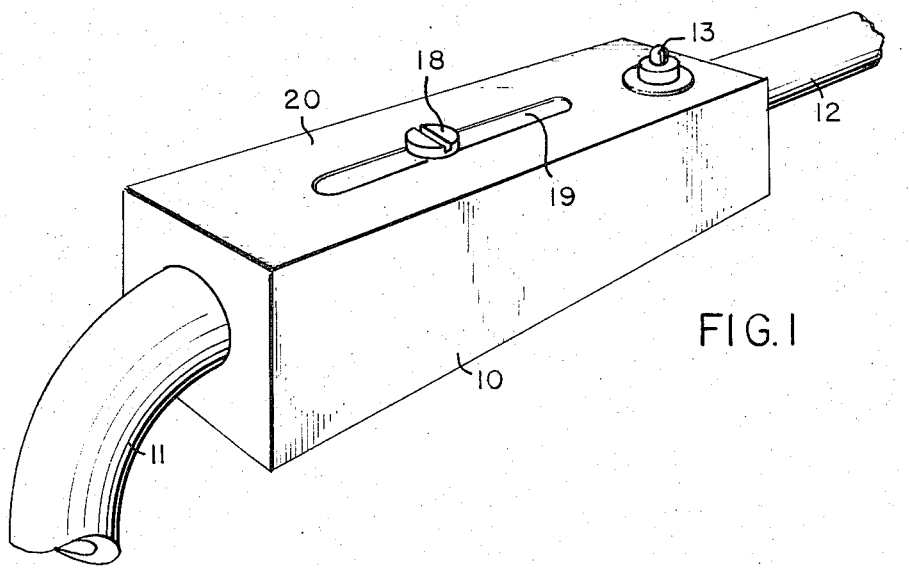
FIG. 1 is a perspective view of the valve of the invention.

Turning now descriptively to the drawings, in which similar reference characters denote similar elements throughout the several views, FIG. 1 illustrates the valve 10 fitted in between inlet pipe 11 and outlet pipe 12. The top face 20 of the valve 10 is fitted with a longitudinal slot 19 in which adjustment screw 18 rides. Spring regulation screw 13 also protrudes above the top face 20 of the valve for adjustment purposes.

Figure 2:
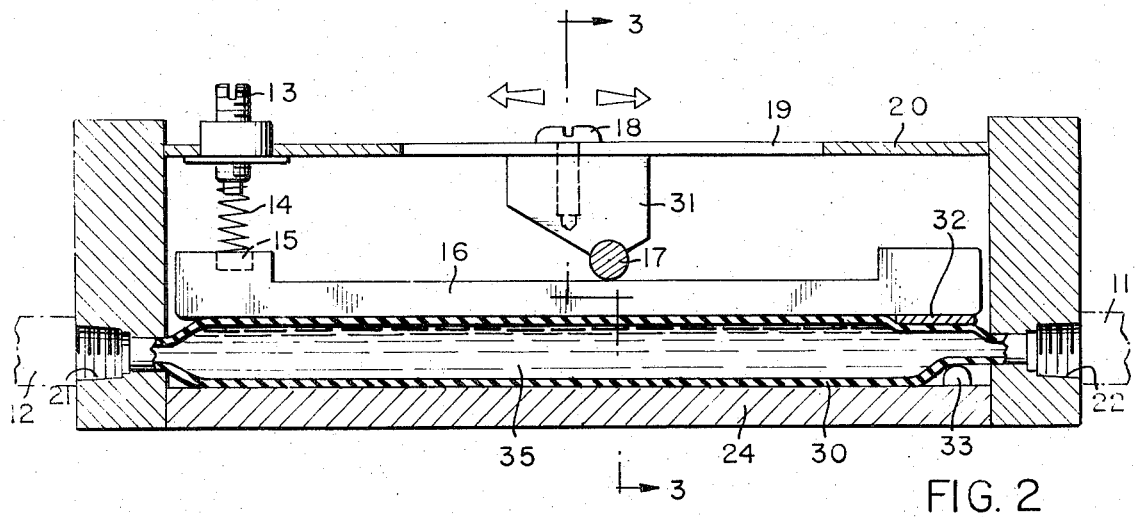
FIG. 2 is a longitudinal sectional view of the valve.
Figure 3:
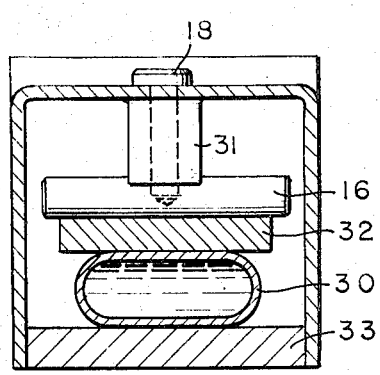
FIG. 3 is a cross-section view of the valve unit taken at line 3—3 of FIG. 2.

As shown in FIGS. 2–3, the fluid 35 is confined in the valve in a flexible tube 30 which may be formed of a thin flexible bladder. Lever arm 16 rests longitudinally along the external length of tube 30, being held in place at one end by a compression spring 14 which bears against a recess 15 in the end of the lever arm 16. The pressure exerted by compression spring 14 against the end of the lever arm 16 is adjusted by rotation of adjustment screw 13 which bears against the end of spring 14. Pivot member 31 is located in longitudinal position by attached screw 18 which rides in the slot 19 of the top face 20 of the valve, with roller 17 mounted at the end of pivot member 31 so as to bear against the lever arm 16 restraining lever arm 16 against flexible tube 30 through which the fluid 35 flows. Pressure of the fluid 35 from intake pipe 11, which is joined to the valve by intake threaded port 22, causes flexible tube 30 to expand in diameter, and to bear against lever arm 16 which is free to rotate against pivot roller 17. Rotation of lever arm 16 will occur about pivot roller 17 when there is an imbalance of moment of forces about pivot roller 17. With the pivot roller 17 located close to the intake port 22, the imbalance of the rotational moment on lever arm 16 will cause the lever arm 16 to rotate in the closing direction with the intake port end of lever arm 16 and attached bearing section 32 tending to compress the flexible tube 30 against fixed external stop 33, and acting to reduce or close the internal orifice of the tube 30. Such reduction of the internal orifice of the tube 30 acts to reduce the flow of and pressure incoming fluid from intake pipe 11.

In operation, pivot member 31 is located longitudinally at the position of screw 18 in slot 19, which results in an orifice restriction of the tube 35, between fixed stop 33 and lever arm bearing section 32, to deliver the desired flow and pressure of fluid 35 through outlet pipe 12, fastened to threaded outlet port 21.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A valve for regulating the flow and pressure of a fluid passing through the valve from an inlet orifice to an outlet end, in which said fluid is confined within a flexible tube in the valve, with the operating mechanism of the valve protected from contact with the fluid enclosed in the flexible tube, said flexible tube being of elastic properties so as to expand under increased internal fluid pressure, with a lever arm resting along the external longitudinal length of the flexible tube, said lever arm being held against theflexible tube by the force of biasing means located near the outlet end of said tube, and by a pivot member which may be adjustably located to a fixed position along the length of the lever arm, such that expansion of the flexible tube caused by the internal pressure of fluid within the tube causes the lever arm to rotate when the pivot member is positioned so that there is an imbalance of rotational moment applied to the lever arm by the sum of the moments exerted by the flexible tube against the lever arm on both sides of the pivot member, combined with the force exerted by the biasing means, with the rotational movement of the lever arm in the closing direction acting to force a bearing section of the lever arm resting against the flexible tube to constrict the flexible tube against an external stop mounted in the unit, so as to reduce the internal inlet orifice of the flexible tube at the position of such constriction with a consequent reduction in fluid pressure in the flexible tube outlet section.

2. The combination as recited in claim 1 in which said biasing means is a compression spring fitted with an adjustment screw which bears against one end of the compression spring so as to regulate the compressive force of the spring against the lever arm.

3. The combination as recited in claim 2 in which the adjustable pivot member is fastened to a screw which rides in a slot in an external wall of the valve unit, said slot axis being generally parallel to the axis of the flexible tube, with the pivot member and attached screw fixed in position when the head of said screw is tightened against the external face of the valve wall bearing said slot.

* * * * *